United States Patent
Pasquini

[11] 3,899,058
[45] Aug. 12, 1975

[54] COMBINED TRACTOR STEERING CLUTCH AND BRAKE CONTROL SYSTEM

[75] Inventor: Daniel Pasquini, Bartonville, Ill.

[73] Assignee: Caterpillar Tractor Co., Peoria, Ill.

[22] Filed: Feb. 1, 1974

[21] Appl. No.: 438,596

[52] U.S. Cl............ 192/13 R; 192/12 C; 192/91 R; 188/359; 91/378; 137/109
[51] Int. Cl.² ........................................ F16D 67/04
[58] Field of Search............... 192/13 R, 12 C, 18 A

[56] References Cited
UNITED STATES PATENTS

| | | | |
|---|---|---|---|
| 3,054,491 | 9/1962 | Bloch et al. | 192/109 F X |
| 3,080,026 | 3/1963 | Koch | 192/13 R |
| 3,262,525 | 7/1966 | Ehlke et al. | 192/13 R |
| 3,494,449 | 2/1970 | Umeda et al. | 192/13 R |
| 3,595,352 | 7/1971 | Todeschini | 192/12 C |

Primary Examiner—Benjamin W. Wyche
Attorney, Agent, or Firm—Phillips, Moore, Weissenberger Lempio & Strabala

[57] ABSTRACT

A combined steering clutch and brake control system for track-type vehicles. The system includes a pair of hydraulic booster valves modified for cooperation with flow control valve means for controlling fluid flow to the vehicle steering components. The booster valves and flow control means are arranged within the system for combined sequential control of the clutching and braking functions of each track of the vehicle by selective operation of a control lever associated with each booster valve. The control system permits an independent braking function by simultaneous operation of the control levers to apply the braking mechanism of both tracks.

9 Claims, 2 Drawing Figures

COMBINED TRACTOR STEERING CLUTCH AND BRAKE CONTROL SYSTEM

BACKGROUND OF THE INVENTION

This invention relates to hydraulic control systems. In particular, this invention relates to a simplified hydraulic steering clutch and brake control system having particular use for controlling the braking and steering of track-type vehicles such as crawler tractors.

The numerous disadvantages associated with mechanical control systems for large, track-type vehicles such as the great amount of physical effort required to operate the usually large control levers has resulted in the development of hydraulic control systems for these vehicles which are convenient and relatively easy to operate. Exemplary of such systems are the steering clutch hydraulic control system and brake hydraulic booster system for track-type vehicles described respectively in U.S. Pat. application Ser. Nos. 285,925 and 285,926 to Bridwell et al., of common assignment herewith.

Although such hydraulic systems have greatly facilitated the operational control of the vehicles having these systems, separate brake and clutch control systems are still often conventionally employed for independent control of the brake and steering functions. In addition to the costliness of these control systems, their complexity of operation has frequently proven detrimental to the efficient operation of the primary functions of the vehicle. For example, the diverse earthworking attachments employed with track-type earthworking vehicles such as crawler tractors demand the constant attention of the operator, and it is highly desirable that simplified braking and steering controls be provided so that the operator may be as free as possible to devote his attention to his earthworking operations.

Accordingly, it is desirable that a simple, relatively inexpensive and reliable combined control system be provided for track-type vehicles to allow single lever or pedal control of the driving track braking and steering clutch functions. Although combined control systems for hydraulic steering clutch and braking systems are known in the art, such as those described in U.S. Pat. Nos. 2,981,235, to Seddon; 3,374,846, to Massone; and British Pat. No. 1,218,526, published Jan. 1971; these systems are frequently complex and costly, and occasionally unreliable or of limited application. Other related prior art systems include U.S. Pat. Nos. 2,678,703; 2,989,986; 3,305,037 and 3,369,460 issued respectively to Williams et al.; to Schmitt; to Stow; and to Ehlke et al., all of common assignment herewith; and British Pat. No. 1,170,034, published on Nov. 12, 1969.

SUMMARY AND OBJECTS OF THE INVENTION

The invention provides a combined control system for steering clutches and brakes of track-type vehicles which permits single-lever selective sequential control of the clutching and braking functions of each track and which further permits independent braking by simultaneous actuation of the control levers for each track to effect braking thereof. The control system includes a pair of hydraulic brake booster valves modified for cooperation with flow-control valve means for controlling hydraulic fluid flow to the track steering clutches. The booster valves and flow control valve means are arranged for sequential control of the clutching and braking functions of each track of the vehicle by selective operation of a single control lever associated with each booster valve. Hydraulic fluid flow may thus be sequentially directed to the steering clutches and to the braking mechanism on the right or left side of the vehicle by operation of a single control lever for each side. Independent braking is accomplished by simultaneous operation of the right and left control levers to create a hydrostatically locked condition in the flow control valve means which blocks the flow of hydraulic fluid required to disengage the steering clutches, and to supply hydraulic fluid to actuate the braking mechanism.

It is a primary object of the invention to provide a simplified combined control system for hydraulically-actuated steering clutches and brakes of track-type vehicles.

It is another object of the invention to provide a simple, inexpensive and reliable control system for hydraulically-actuated steering clutches and brakes of track-type vehicles which provides for single lever actuation of each track and for single-lever sequential control of the clutching and braking functions of each track.

It is a further object of this invention to provide a simple, reliable and inexpensive combined control system for hydraulic brake booster valves and steering clutches in a track-type vehicle.

Other objects and advantages of the invention will become apparent from the following description and drawings.

DETAILED DESCRIPTION

Figure 1:
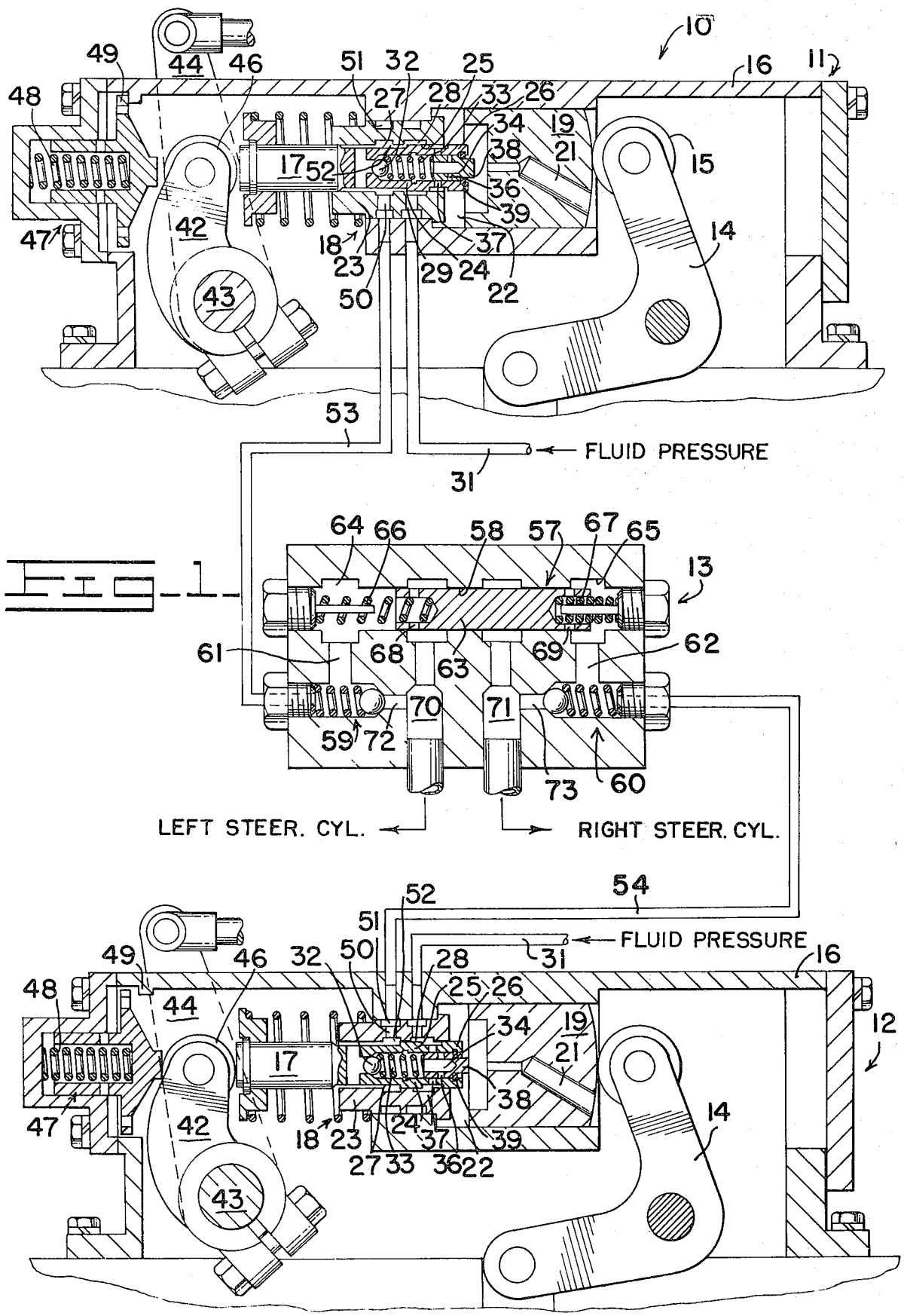
FIG. 1 is a partially schematic, partially sectional representation of the control system of this invention disposed for disengagement of a hydraulic steering clutch.
Figure 2:
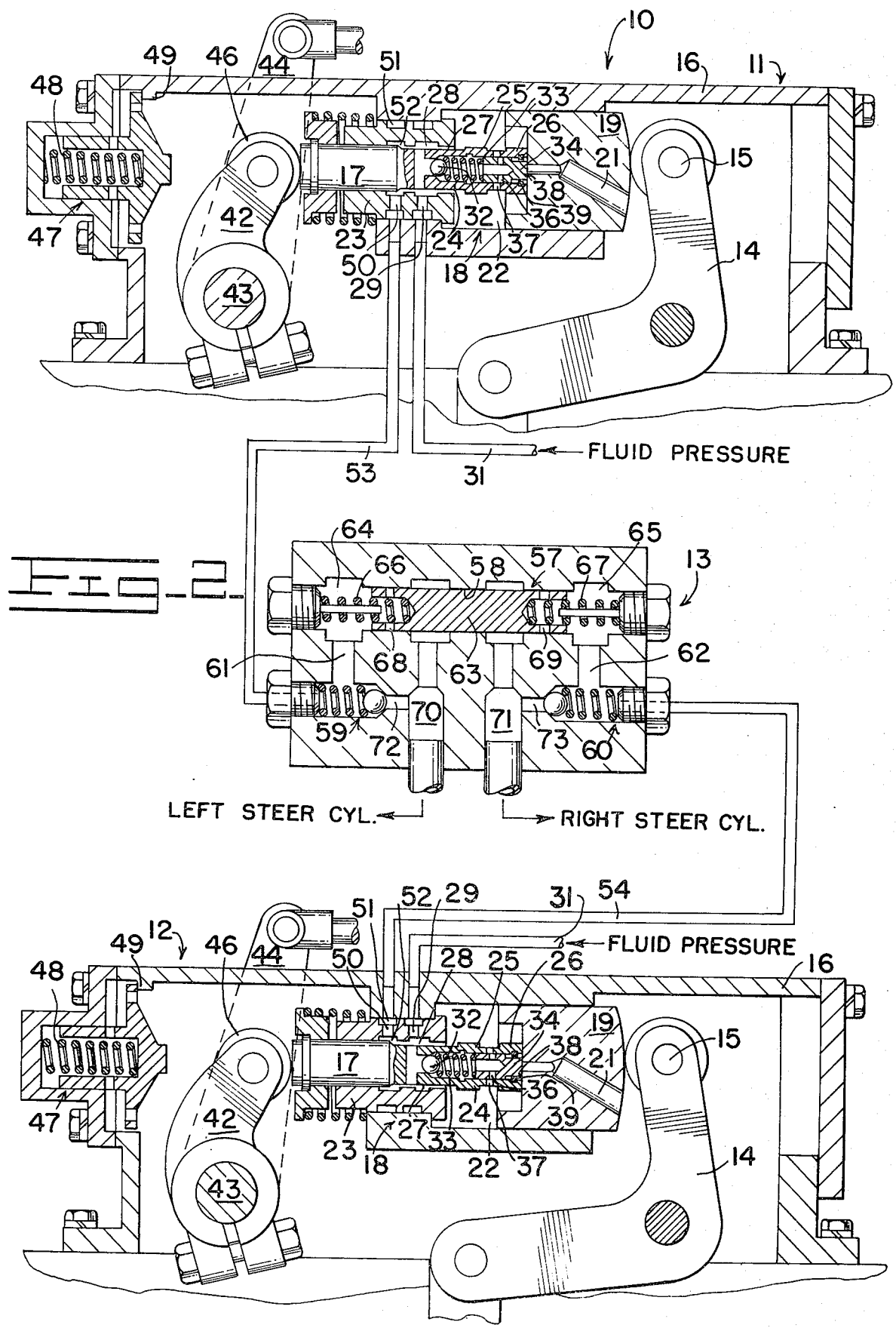
FIG. 2 is a view similar to FIG. 1, but illustrating the control system disposed for engagement of a pair of hydraulically actuated brakes.

FIGS. 1 and 2 illustrate a combined steering clutch and brake control system 10 including a pair of hydraulic brake boosters 11 and 12 modified as hereinafter described, and flow control valve means 13 for controlling the flow of hydraulic fluid to a pair of conventional spring-engaged, hydraulically disengaged steering clutches (not shown). The system is adaptable by suitable prior art for operative association with a track-type vehicle such as a crawler tractor or loader having a steering control function requiring partial or complete disengagement of the steering clutches prior to application of the brakes (not showw). For example, the control system 10 may be effectively substituted for the dual clutch and brake control described in U.S. Pat. No. 3,262,525 to Ehlke et al., of common assignment herewith.

Suitable brake mechanisms for use with the control system 10 include that described in U.S. Pat. No. 2,678,703 to Williams et al., of common assignment herewith. One of these brake mechanisms is operatively communicated with each of the booster components 11 and 12 through an extended toggle linkage (not shown) included in the brake mechanism. This toggle linkage is connectible to a bellcrank 14 pivotally connected to each of the booster means 11 and 12 by a roller 15. Rotation of the bellcranks about their shafts in a manner hereinafter described pulls upward on the linkage to actuate the brake members, as described in the Williams et al. patent.

For convenience, the control system 10 will be referred to as having left and right hydraulic boosters 11 and 12, respectively, which respectively control left and right brakes and left and right steering clutches for the left and right tracks of the vehicle. However, it should be understood that these elements are substantially identical for each side of the vehicle, and thus, the corresponding elements are completely interchangeable from side to side.

The booster means 11 and 12 include a booster housing 16 enclosing a spring-biased plunger 17, a booster valve 18, and piston means 19 containing therein drain passage means 21 for draining hydraulic fluid from a cavity 22 between the booster valve 18 and the piston means 19. The booster valve 18 includes a valve housing 23 slideably engaged within the booster housing 16 for leftward and rightward movement therein as shown in FIGS. 1 and 2 in response to shifting of the plunger 17 in the corresponding direction. The valve housing 23 houses a valve spool 24 having lands 25 and 26 thereon and an axial relief area 27 which is communicable with a first annular groove 28 in the valve housing. The groove 28 communicates via a port 29 in the valve housing 23 with a hydraulic fluid supply conduit 31 communicating in turn with a fluid supply source (not shown).

The valve spool 24 includes check valve means such as a spring biased check valve 32 having a biasing spring 23 for controlling the direction of fluid flow through the valve spool 24. The valve spool 24 further includes a hollow valve member 34 slideably engaged within the valve spool and seating against the spring 33 of the check valve 32. The valve member 34 includes radial ports 36 communicating with the hollow interior of the valve member and registrable with ports 37 of the valve spool 24, as shown in FIG. 2. The valve member 34 also includes a forward portion 38 projecting beyond the valve spool 24 when the spring 33 is decompressed, as shown in booster 12 of FIG. 1, and has a snap ring 39 for retention of member 34.

The boosters 11 and 12 include shifting means for shifting the plunger 17 such as a linkage 42 rotatable around an axis 43 by a manually operable lever 44 affixed to the linkage 42. The linkage 42 includes a cam roller member 46 which acts upon the plunger 17 to shift it rightwardly to compress the plunger biasing spring with clockwise rotation of the cam member, and leftwardly to release the plunger biasing spring with counterclockwise rotation of the cam member. Preferably, the shifting means are provided with means such as a stop 47 for preventing the abrupt release of the plunger biasing spring on operation of the lever 44 to rotate the cam member 46 counterclockwise, and for thus preventing damage to the booster components. The stop 47 includes a spring 48 normally urging the stop against a seat 49 on the booster housing 16. As the cam member is rotated counterclockwise from the position shown in FIG. 2, it eventually contacts the stop as shown in booster 12 of FIG. 1, and the counterclockwise rotation is continued to the desired position against the urging of the spring 48.

The boosters 11 and 12 as described thus far comprise conventional hydraulic boosters, and are intended to be illustrative thereof. However, the boosters 11 and 12 as above-described are each modified in the inventive control system 10 for coordinated operation with the flow-control valve means 13 by the provision of a port 50 in the valve housing 23 communicating between a second annular groove 51 in the outer circumference of the valve housing and a third annular groove 52 in the inner circumference of the valve housing, which in turn communicates with the axial relief 27 of the valve housing 23. A pair of conduits 53 and 54 communicate between the second annular grooves 51 of boosters 11 and 12, respectively, and the flow control valve means 13 for controlling flow of hydraulic fluid to the steering clutch servo motors.

The flow control valve means 13 of the control system 10 include a shuttle-type valve 57 disposed within a bore 58, and check valve means such as a pair of spring-biased ball check valves 59 and 60 for directing fluid flow from the conduits 53 and 54, respectively, to opposite ends of the shuttle valve 57 via a pair of passages 61 and 62, respectively.

The shuttle valve 57 includes a valve spool 63 forming with the bore 58 a pair of actuating valve chambers 64 and 65 at opposite ends of the valve spool. The valve spool 63 is biased by a pair of springs 66 and 67 disposed within the chambers 64 and 65, respectively, for urging the valve spool into a centered position in the bore 58. The valve spool 63 is provided with a pair of annular metering ports 68 and 69 at opposite ends thereof, which are respectively communicable with a first clutch line 70 to the left steering clutch and a second clutch line 71 to the right steering clutch. As shown in FIG. 2, the metering ports 68 and 69 are blocked when the valve spool 63 is centered in the bore 58. The flow control valve means 13 further includes a pair of passages 72 and 73, communicating the check valve 59 with the line 70, and communicating the check valve 60 with the line 71, respectively.

The operation of the brakes and steering clutches associated with the control system 10 will now be explained.

Selective disengagement of the right and left steering clutches for accomplishing steering maneuvers of the vehicle is obtained by selectively supplying sufficient hydraulic fluid from the fluid supply source to the clutch to be disengaged. In FIG. 1, the control sysytem 10 is shown positioned to block fluid flow to the right steering clutch, and supply fluid to the left steering clutch for a left hand turn. Disengagement of the left clutch is accomplished as follows:

The levers 44 of the boosters 11 and 12 are originally disposed so that both booster valves 18 are positioned in a first valve position as shown in booster 12 of FIG. 1, for engagement of both the right and left clutches. In this position, the land 25 of the valve spool 24 blocks fluid flow from the conduit 31 to the conduits 53 and 54, thus blocking fluid flow to the flow control valve means 13. To disengage the left clutch, the lever 44 is moved to the position shown for this lever in the booster 11 of FIG. 1. The plunger 17 and the booster valve 18 are thereby shifted rightwardly to the second valve position illustrated for the booster 11 in response to the clockwise rotation of the cam member 46 as the lever 44 is thus moved. With the valve 18 in this position, the conduit 31 is in communication with the conduit 53 via the port 29, the axial relief 27, and the port 50 of the booster 11. Hydraulic working fluid may now flow from the fluid supply source, through the booster valve 18 to the control valve means 13 via the conduit 53. Fluid entering the check valve 59 and the passage 61 accumulates in the corresponding valve chamber 64 until the fluid pressure in this chamber establishes a pressure differential between the chambers 64 and 65 sufficient to shift the valve spool 63 rightwardly to the position shown, thus permitting fluid to flow through the metering port 68 into the left clutch line 70. Fluid then flows through the line 70 to the left clutch to thereby disengage it.

The left clutch may be re-engaged by returning the lever 44 to the original position shown in the booster 12 of FIG. 1. Returning the lever to this position rotates the cam member 46 counterclockwise, and releases the biasing spring of the plunger 17, shifting the booster valve 18 leftwardly to the first valve position to block fluid flow to the control valve means 13, as described above. The valve spool 63 will rapidly return to a centered position as fluid pressure is removed from the chamber 64, and any pressurized fluid remaining in the line 70 will open the check valve 59, flowing through this valve and through the conduit 53 to drain through the valve 18 via the port 29 and axial groove 27.

Simultaneous braking of the right and left tracks of the vehicle may be accomplished by positioning the components of the control system 10 as shown in FIG. 2. As shown in FIG. 1, in the first and second positions of the valve 18, the land 26 blocks fluid flow from the fluid supply conduit 31 to the cavity 22. Movement of the levers 44 to the positions shown in FIG. 2, however, moves the valves 18 rightwardly from the second valve position to a third valve position in the manner described above, displacing the land 26 from its fluid-blocking position in the valve spool 24 and permitting fluid from the conduits 31 to enter the cavities 22 of the boosters 11 and 12. The rightward movement of the valves 18 to the third valve position forces the valve member 34 against the drain passage means 21, thereby sealing the drain passage against fluid flow and urging the valve member leftwardly within the valve spool 24 against the spring 33. The sealing of the drain passage means 21, together with the displacement of the land 26 to allow fluid to flow into the cavities 22 via the axial relief 27, and via the check valve 32, the interior of the valve member 34, and the ports 36 and 37 which are now in registry, results in the accumulation of fluid within the cavities 22. The accumulation of sufficient fluid pressure in these cavities shifts the piston means 19 rightwardly to the position shown in FIG. 2, thereby actuating the right and left brakes as previously described.

As may be seen in FIG. 2, the simultaneous braking of both track brakes by operation of the levers 44 of the boosters 11 and 12 to move the valves 18 to the third valve position as described above, hydrostatically centers the shuttle valve 57 in the bore 58, blocking the metering ports 68 and 69. Hydraulic fluid flow to both clutches is thereby blocked and the clutches remain engaged for a brake only operation.

Selective combined steering clutch and brake control becomes available again as the operator moves at least one of the valves 18 leftwardly to break the hydrostatic balance of the shuttle valve 57. Preferably, the boosters 11 and 12 include a plunger 17 and a valve spool 24 having lands 25 and 26 which are axially spaced so that a relatively slight shifting of the plunger 17 quickly makes available full pump pressure to the clutches and/or brakes. If desired, the manual levers 44 may be replaced by laterally adjacent left and right pedals for shifting the plunger 17, which are simultaneously depressed to effect the brake only stopping described above. Alternatively, a third, dual purpose brake-only pedal such as described in the previously mentioned U.S. Pat. No. 3,262,525 to Ehlke et al. could be provided.

The described invention thus provides a simple, effective combined control system for steering clutches and brakes of track-type vehicles which system permits single lever control of the clutch and braking functions of each track. Independent braking by simultaneous operation of the levers to effect braking of both tracks is also permitted. The control system thereby eliminates separate sophisticated and costly control valves for clutch and steering functions which are typically employed.

While the invention has been described with particular reference to the preferred embodiment, it is apparent that variations and modifications are possible within the purview of the inventive concepts. No limitation with respect to such variations and modifications is intended, except by the scope of the appended claims.

I claim:

1. In a track-type vehicle having first and second clutch and brake controlled tracks, a combined control system for sequential control of the steering clutch and brake functions of said tracks, said control system including, a source of fluid under pressure, first and second booster valve means for respectively controlling the clutch and brake means of said first and second track, first fluid communication means between said source and said first booster valve means, second fluid communication means between said source and said second booster valve means, flow control valve means for controlling the flow of fluid under pressure from said first and second booster valve means to respectively said clutches for said first and second tracks, third and fourth fluid communication means respectively between said first booster valve means and said flow control valve means and between said second booster valve means and said flow control valve means, first and second actuation means for respectively mechanically actuating said first and second booster valve means for controlling the flow of fluid through said third and fourth fluid ccommunication means and for selectively causing the engagement of said first and second brakes of said tracks, said flow control valve means including first and second inlet ports connected respectively to said third and fourth fluid communication means, said control valve means further including first and second outlet ports connected by means of fifth and sixth fluid communication means to said respective clutches of said first and second tracks for selective engagement and disengagement of said clutches said flow control valve means including means for blocking fluid flow from said third and fourth communication means to said fifth and sixth communication means when fluid pressure in said third communication means is substantially the same as that in said fourth communication means.

2. The invention of claim 1 further including a control bore respectively selectively connecting said third and fifth fluid communication means and connecting said fourth and sixth fluid communication means.

3. The invention of claim 1 wherein said first and second booster valve means each include a housing having a booster bore containing a booster spool and a piston with a cavity therebetween, said pistons operable for directly engaging said brakes upon movement in a direction away from said booster spools by virtue of the selective communication of pressure fluid to said cavities, said first and second booster valve means including one-way valve means for controlling the flow of fluid into said cavities of said first and second booster valve means.

4. The invention of claim 3 wherein said first and second pistons are each provided with a drain passage for selectively draining said first and second cavities of fluid, said first and second booster spools including portions thereon for selectively blocking said drain passages upon actuation of said first and second actuation means.

5. In a track-type vehicle having first and second clutch and brake controlled tracks, a combined control system for sequential control of the steering clutch and brake functions of said tracks, said control system including, a source of fluid under pressure, first and second booster valve means for respectively controlling the clutch and brake means of said first and second track, first fluid communication means between said source and said first booster valve means, second fluid communication means between said source and said second booster valve means, flow control means for controlling the flow of fluid under pressure from said first and second booster valve means to respectively said clutches for said first and second tracks, third and fourth fluid communication means respectively between said first booster valve means and said flow control valve means and between said second booster valve means and said flow control valve means, first and second actuation means for respectively mechanically actuating said first and second booster valve means for controlling the flow of fluid through said third and fourth fluid communication means and for selectively causing the engagement of said first and second brakes of said tracks, said flow control valve means including first and second inlet ports connected respectively to said third and fourth fluid communication means, said control valve said control valve means further including first and second outlet ports connected by means of fifth and sixth fluid communication means to said respective clutches of said first and second tracks for selective engagement and disengagement of said clutches, a control bore respectively selectively connecting said third and fifth fluid communication means and connecting said fourth and sixth fluid communication means, control spool means movably received within said control bore, said spool means being positionable in a first position for permitting fluid flow from said first inlet port through said control bore to said outlet port while simultaneously blocking fluid flow from said second inlet port to said second outlet port.

6. The invention of claim 5 wherein said spool means is further movable to a second position for permitting fluid flow from said second inlet port to said second outlet port while simultaneously blocking flow from said first inlet port to said second inlet port.

7. The invention of claim 6 wherein said spool means is further movable to a third position wherein it simultaneously blocks the flow of fluid from said first and second inlet ports to said first and second outlet ports.

8. The invention of claim 7 wherein said flow control valve means further includes first and second passageways directly connecting said first outlet port with said first inlet port and directly connecting said second inlet port with said second outlet port respectively.

9. The invention of claim 8 wherein first and second check valves are provided respectively in said first and second passageways for permitting fluid flow through said passageways only from said outlet ports to said inlet ports.

* * * * *